US006068911A

United States Patent [19]

Shouji et al.

[11] Patent Number: 6,068,911

[45] Date of Patent: May 30, 2000

[54] SUPER WATER-REPELLENT COATING MATERIAL, AND SUPER WATER-REPELLENT COATING FILM USING THE SAME

[75] Inventors: Mitsuyoshi Shouji, Juoh-machi; Tomoyuki Hamada, Hitachi; Ken'ichi Kawashima, Hitachinaka; Yutaka Ito, Takahagi, all of Japan

[73] Assignee: Hitachi, Ltd., Tokyo, Japan

[21] Appl. No.: 08/838,258

[22] Filed: Apr. 17, 1997

[30] Foreign Application Priority Data

Apr. 18, 1996 [JP] Japan .................................... 8-096528

[51] Int. Cl.$^7$ ........................................................ B32B 5/16

[52] U.S. Cl. .......................... 428/143; 428/212; 428/219; 428/220; 428/323; 428/340; 428/421; 428/422

[58] Field of Search ..................................... 428/323, 421, 428/422, 143, 149, 212, 219, 220, 340, 457, 461, 463

[56] References Cited

U.S. PATENT DOCUMENTS

| | | | |
|---|---|---|---|
| 4,797,321 | 1/1989 | Funahashi et al. | 428/328 |
| 5,219,651 | 6/1993 | Shoji et al. | 428/323 |
| 5,424,438 | 6/1995 | Chittofrati et al. | 546/336 |
| 5,456,980 | 10/1995 | Murakami et al. | 428/336 |

*Primary Examiner*—Hoa T. Le

*Attorney, Agent, or Firm*—Antonelli, Terry, Stout & Kraus, LLP

[57] ABSTRACT

A super water-repellent coating film is formed of a super water-repellent coating material comprising an organic coating material composed of organic polymer, a filler mixture composed of plural kinds of fillers of at least 5 nm in average particle diameter, which is dispersed in the coating material, and a perfluoropolyoxyalkyl group compound. Because the surface of various solid bodies can be made super water-repellent by a simple process using this water-repellent coating material, the coating film can be utilized in various fields, such as preventing snow covering, frosting, ice coating, water adhering, and other applications.

25 Claims, 6 Drawing Sheets

SUPER WATER-REPELLENT COATING MATERIAL, AND SUPER WATER-REPELLENT COATING FILM USING THE SAME

BACKGROUND OF THE INVENTION

The present invention relates to a super water-repellent coating film and to super water-repellent coating material to form the super water-repellent coating film. A super water-repellent coating film can be utilized for preventing snow covering, frosting, icing of surface, and the like. Practically, the super water-repellent coating material can be utilized in, for instance, treatment of an evaporator fin surface of an air conditioner for preventing the fin from frosting during a heating operation, or treatment of a parabolic antenna surface, for which the maintenance operation in winter is difficult because of heavy snow. Other practically applicable fields for a super water-repellent coating material are, for example, as a coating material for preventing icing of ships and aircraft, a coating material for the outer wall of houses, and a surface coating material for preventing water drop adhesion on the windshield of an automobile. Furthermore, for instance, the energy used to transport fluids in pipes can be reduced by super water-repellent treatment of the inner surface of a pipe used for aqueous solution transportation. Indeed, the field of application of super water-repellent coating films can be expected to expand more than ever in the future.

The super water-repellent phenomenon itself is not known generally, nor has there been any patent relating to a super water-repellent coating film. Although an introductory report on products using a super water-repellent coating film has been published in Nikkei Business, Feb. 13, 1995, no actual product in the form of a super water-repellent coating film has been commercialized. The reason is because technology to supply a large amount of super water-repellent coating film material at a reasonable price has not been established yet, and a super water-repellent coating film can not be obtained stably.

The super water-repellent phenomenon requires a contact angle of a solid body with water of at least 150 degrees. Under this condition, water forms water drops and moves on the surface of the solid body freely. When the contact angle is 180 degrees representing the maximum super water-repellent phenomenon, the contact area of the water drop and the solid body becomes zero. In the super water-repellent coating film, the surface profile of the coating film should be made fractal, or be formed so that the surface area per unit becomes indefinitely large, in addition to making the surface energy at the surface of the coating film low. In order to make the surface energy low, a fluorine group or silicon group surface treatment agent is generally used. However, the technology to form a surface profile having a fractal shape, or a surface profile having an indefinitely large surface area per unit, is difficult and hardly achieved. It is still uncertain in what range of sizes the surface is to be made fractal to effectively produce the super water-repellent phenomenon. Accordingly, the surface profile is difficult to form preferably. Especially, the surface of the coating film is difficult to form the by applying a coating material. However, if the super water-repellent coating film is formed by applying a coating material, utilization of the coating film can be extended widely, and a super water-repellent treatment of various surfaces will be available.

In view of these aspects of the super water-repellent technology, the inventor of the present invention has conducted research, and has found that a super water-repellent coating film can be obtained by forming a fractal shape at the surface of the coating film with a filler which is dispersed in the coating material, so that the surface area per unit is made indefinitely large, and by concurrently fluorinating the surface of the coating film with a perfluoropolyoxyalkyl compound added to the coating material, resulting in the present invention.

SUMMARY OF THE INVENTION

One of the objects of the present invention is to provide a super water-repellent coating film, which is an organic coating film composed on a solid body, characterized in that the organic coating film comprises a first layer, wherein the fractal dimension, obtained by dispersing at least two kinds of fillers, is at least 2.4, and a second layer, which is located at the upper surface of the first layer and comprises a perfluoropolyoxyalkyl group compound or a perfluoropolyoxyalkylene group compound.

One of the other objects of the present invention is to provide a super water-repellent coating film, which is an organic coating film composed on a solid body, characterized in that the organic coating film comprises a first layer, wherein the fractal dimension, obtained by dispersing at least two kinds of fillers, is at least 2.4, and the range of a surface multiple coefficient (a coefficient giving the ratio of actual area of a rough surface to the projected area) is at least 2.0, and a second layer, which is located at the upper surface of the first layer and comprises a perfluoropolyoxyalkyl group compound or a perfluoropolyoxyalkylene group compound.

The above filler has preferably an average particle diameter of at least 5 nm, and the value, at least 2.4, of the fractal dimension is preferably measured in the range from 0.05 $\mu$m to 12.0 $\mu$m of the measuring scale.

Furthermore, one of the other objects of the present invention is to provide a method for forming a super water-repellent coating film on a solid body, characterized in that the filler mixture consists of at least two kinds of fillers dispersed into a solution containing a perfluoropolyoxyalkyl group compound or a perfluoropolyoxyalkylene group compound, and the dispersed solution is applied onto the solid body.

Furthermore, one of the other objects of the present invention is to provide a super water-repellent coating material comprising an organic coating material, a filler mixture containing plural fillers of 10~150% by weight to the organic coating material, a perfluoropolyoxyalkyl group compound or a perfluoropolyoxyalkylene group compound of 1~10% by weight to the organic coating material, and a solvent.

The perfluoropolyoxyalkyl group compound or the perfluoropolyoxyalkylene group compound used for the super water-repellent coating film or the coating material of the present invention is a compound expressed by the following general chemical formula (I):

$$Rf(-A-X-B-Y)n \quad (I)$$

where,

Rf: perfluoropolyoxyalkyl group or perfluoropolyoxyalkylene group,

A and B: any one of amido group, ester group, or ether group,

X: any one of the following groups;

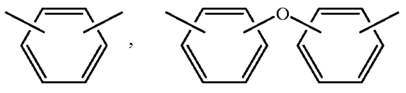

,

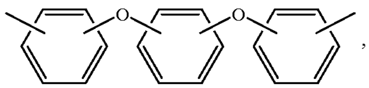

,

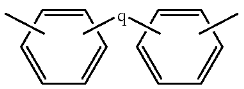

or

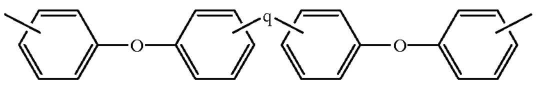

(where, q is any one of $—CH_2—$, $—C(CH_3)_2—$, $—C(CF_3)_2—$, —S—, $—SO_2—$, or direct bond), Y: any one of the following groups; and

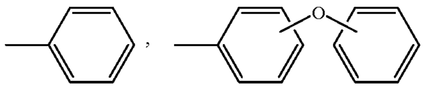

n: 1 or 2.

In the perfluoropolyoxyalkyl group compound or the perfluoropolyoxyalkylene group compound expressed by the above general chemical formula (I), the perfluoropolyoxyalkyl group contains the oxyalkylene repeating unit expressed by the following formulas (II), (III), or (IV), individually or as a mixture of these units;

$$—(CF_2—O)— \quad \text{(II)}$$

$$—(C_2F_4—O)— \quad \text{(III)}$$

$$—(C_3F_6—O)— \quad \text{(IV)}$$

The solvent used for the above super water-repellent coating material is preferably a mixture of a good solvent for the perfluoropolyoxyalkyl group compound or the perfluoropolyoxyalkylene group compound, and a poor solvent for the perfluoropolyoxyalkyl group compound or the perfluoropolyoxyalkylene group compound.

Furthermore, one of the other objects of the present invention is to provide an evaporator fin provided with the above super water-repellent coating film, or a refrigeration air conditioner using the above evaporator fin.

Furthermore, one of the other objects of the present invention is to provide an electric wire coated with the super water-repellent coating film.

In order to make a surface of a layer fractal in accordance with the present invention, wherein the layer is composed of a perfluoropolyoxyalkyl group compound or a perfluoropolyoxyalkylene group compound, plural kinds of fillers having different diameters of at least 5 nm are dispersed into the coating material, and concave and convex shapes of various sizes corresponding to the fillers are formed. In order to evaluate the fractal shape, the fractal dimension obtained from a cross section is used. The surface fractal dimension can be obtained by adding 1 (one) to the fractal dimension of the cross section. Assuming a surface profile model wherein a protrusion at the surface has a hemispherical shape and a Gaussian distribution, a relationship between a structural function and the fractal dimension (D) of the cross section can be expressed by the following equation (V):

$$S(\Delta X) = \frac{1}{L}\int_0^L ([Z(X+\Delta X) - Z(X)])^2 dX = G^{2(D-1)}\Delta X^{2(2-D)} \quad \text{(V)}$$

That means, that the structural function, (s(ΔX)), can be obtained by a square average of the difference between the concave and the convex shapes, (Z(X+ΔX)−Z(X)), and a relationship expressed by 2(2−D)) exists between the structural function, (S(ΔX)), and the scale, (ΔX). On the basis of the above relationship, the fractal dimension, (D), can be obtained. Details of the method for obtaining the fractal dimension are described in, "tribologist", vol. 40, No. 7, (1995), p 539.

In accordance with the present invention, the surface profile of the coating film requires a fractal dimension of at least 2.4. In other words, when the surface profile of the coating film is expressed by the surface multiple coefficient (γ), the coefficient of at least 2.0 is effective. The surface multiple coefficient (γ) indicates a multiple coefficient for the surface area per unit area, and can be calculated by the following equation (VI) with observed contact angles on the surface of a flat plane and of a plane having the concave and the convex shapes (fractal).

$$\cos\theta f = \gamma \cos\theta \quad \text{(VI)}$$

where,

θf: an apparent contact angle at the surface having concave and convex shapes,

θ: a contact angle at the surface of flat plane, and

γ: a surface multiple coefficient (when concave and convex shapes exist, γ>1).

That means that when θ is larger than 90 degrees, θf increases if γ is larger than 1, and the super water-repellent phenomenon can be readily achieved.

Any filler can be used in accordance with the present invention if the filler has an average particle diameter of at least 5 nm. Some examples of the filler which have a relatively small average particle diameter, namely 7~40 nm, are AEROSIL made by Nihon Aerosil Co. Ltd., aluminum oxide, titanium dioxide, and the like. An example of the filler which has a relatively large average particle diameter is NIPSIL made by Nippon Silica Industry Co. Ltd., which is silica having an average particle diameter in the range of 1~4 μm. The larger the specific surface area of filler being used, the better will be the dispersion characteristics in the coating material. Practically, the specific surface area of the filler is preferably at least 100 $m^2$/g.

In accordance with the present invention, a dispersant for the filler is used in order to adequately disperse the filler having an average particle diameter of at least 5 nm into the coating film. As the dispersant, one of the compounds which are expressed by the following general chemical formula (I) is used:

$$Rf(—A—X—B—Y)n \quad \text{(I)}$$

where,

Rf: perfluoropolyoxyalkyl group or perfluoropolyoxyalkylene group,

A and B: any one of amido group, ester group, or ether group,

X: any one of the following groups;

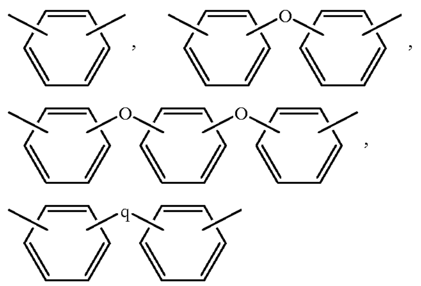

or

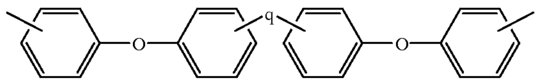

(where, q is any one of $—CH_2—$, $—C(CH_3)_2—$, $—C(CF_3)_2—$, —S—, $—SO_2—$, or direct bond), (The above group is called "Chemical group 12" hereinafter)

Y: any one of the following groups; and

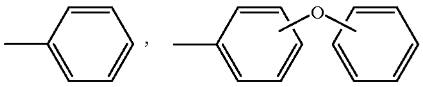

n: 1 or 2.

The perfluoropolyoxyalkyl group compound or the perfluoropolyoxyalkylene group compound expressed by the above general chemical formula (I) operates not only as an dispersant, but also as a raw material for fluorinating effectively the surface of the organic coating film which is formed concurrently.

As compounds of the perfluoropolyoxyalkyl group or the perfluoropolyoxyalkylene group (Rf) of the perfluoropolyoxyalkyl group compound or the perfluoropolyoxyalkylene group compound expressed by the above general chemical formula (I), Krytox group compounds made by E. I. du Pont de Nemours & Co. Ltd., Demnum group compounds made by Daikin Industries Ltd., Fomblin group compounds made by Monte Fluos Co. Ltd., all of which are shown in the following chemical formulas, and the like are used:

Krytox group: $F(CF(CF_3)—CF_2—O)_n—$

Demnum group: $F(CF_2—CF_2—CF_2—O)_n—$

Fomblin group: $F(CF_2—CF_2—O)_x(CF_2—O)_y—$ or $—\{(CF_2—CF_2—O)_x(CF_2—O)_y\}$ where, n is an integer at least 5, $x+y \geqq 5$, and $x/y=0.5\sim2.0$ Examples of the practical structure, when the Krytox group compounds made by E. I. du Pont de Nemours & Co. Ltd. are used as the perfluoropolyoxyalkyl group (Rf), are shown by the following chemical formulas (VII)~(XIV):

VII

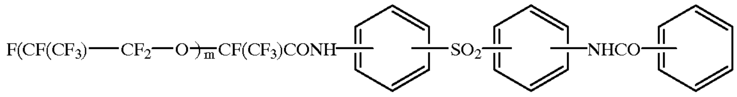

VIII

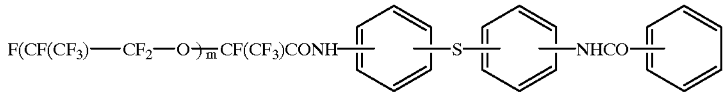

IX

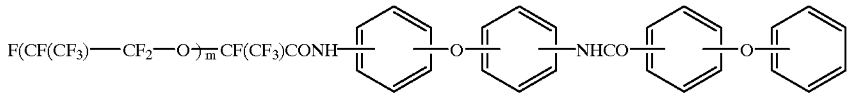

X

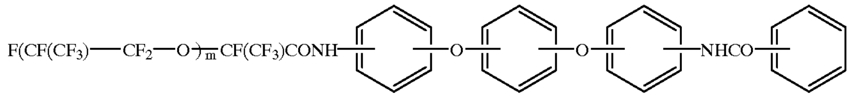

XI

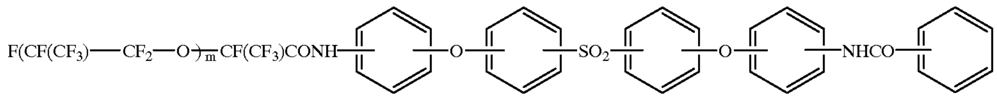

XII

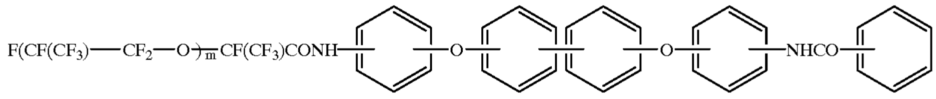

-continued

XIII

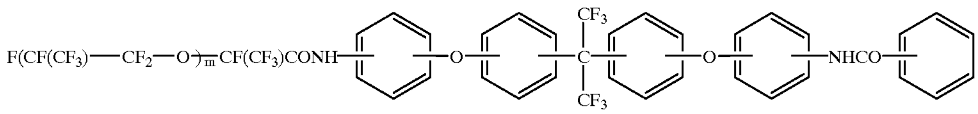

XIV

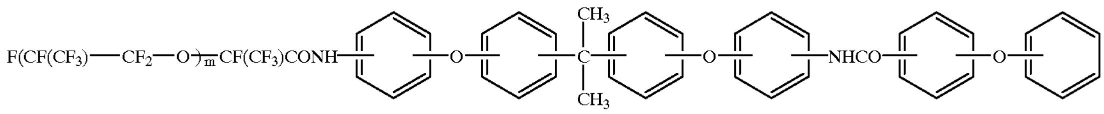

where, m is 14 in average.

Similarly, examples of the practical structure of the perfluoropolyoxyalkyl group compounds, when the Demnum group is used as the perfluoropolyoxyalkyl group (Rf), are shown by the following chemical formulas (XV)~(XXII):

XV

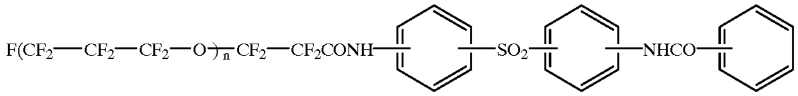

XVI

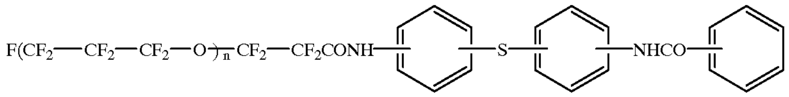

XVII

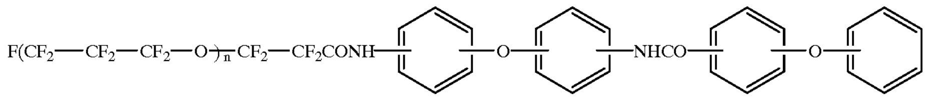

XVIII

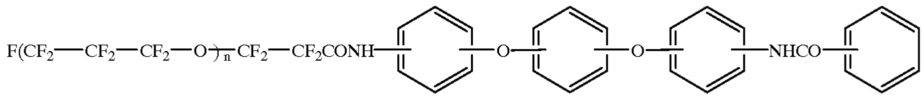

XIX

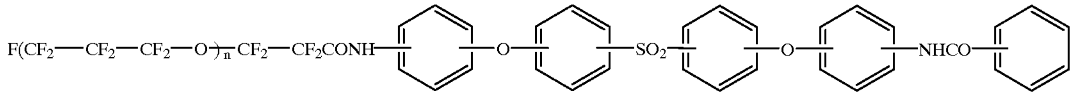

XX

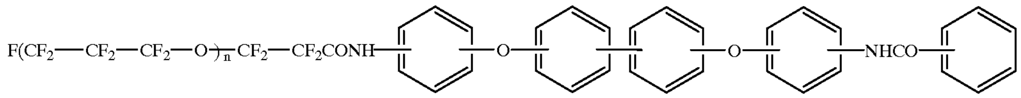

XXI

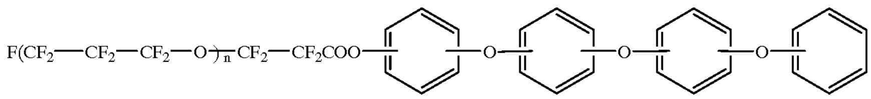

XXII

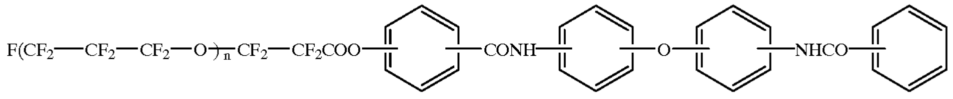

where, n is 19 in average.

Similarly, examples of the practical structure of the perfluoropolyoxyalkyl group compounds, when the Fomblin group is used as the perfluoropolyoxyalkyl group (Rf), are shown by the following chemical formulas (XXiii)~(XXIV):

XXIII

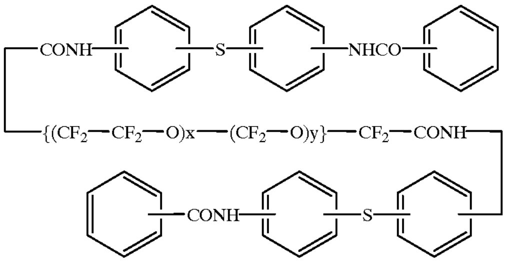

XXIV

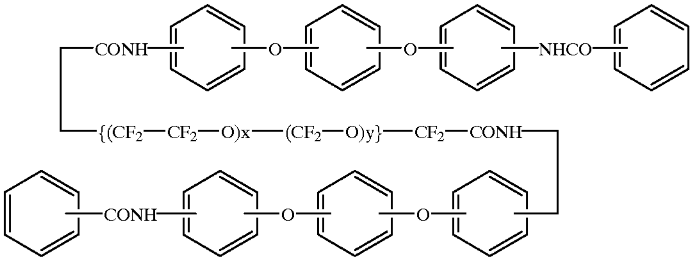

where, x is 21 in average, and y is 27 in average.

As explained above, when the coating film is prepared with a coating material, the perfluoro-polyoxyalkyl group compound and the perfluoropoly-oxyalkylene group compound expressed by the general chemical formula (I) operates concurrently as the raw material for fluorinating the surface of the coating film. Although the raw material can be used individually, a preferable fluorinated surface is composed by mixing a good solvent and a poor solvent with the raw materials adequately. Practically, the perfluoro-polyoxyalkyl group compound expressed by the general chemical formula (I) is mixed with a good solvent having a low boiling point and a poor solvent having a high boiling point. The preferable super water-repellent coating film is prepared by operating the above components effectively. Practically, examples of a good solvent are acetone (b.p. 56.5° C.) and methylethylketone (b.p. 79° C.), and an example of a poor solvent is butylcellosolveacetate (b.p. 196° C.), and the like.

Either of a thermosetting resin and thermoplastic resin organic polymers can be used as the raw material for the organic coating material of the present invention, if the resin can be used as a coating material, disperses the filler preferably, and forms coating film having an appropriate mechanical strength. For instance, thermosetting resins, such as an epoxy resin, phenolic resin, polyimides resin, and the like, and thermoplastic resins, such as a polyesters resin, polyacrylates resin, and the like may be effectively used. However, the raw material is not restricted to the above resins.

In accordance with the practical relationship between the surface profile of the coating film of the present invention and the super water-repellent phenomenon, the preferable super water-repellent phenomenon is realized by a coating film, of which the fractal dimension at the surface of the coating film is at least 2.4 in the range of the scale ($\Delta X$) from 0.05 $\mu$m to 12 $\mu$m, and the surface of which is covered with the perfluoropolyoxyalkyl group compound. Furthermore, if the surface multiple coefficient, obtained from the result of contact angle measurement, is at least 2.0, the super water-repellent phenomenon can be readily realized.

In accordance with the relationship between the scale ($\Delta X$) and size of a water drop, the size of the object water drop is too small when the scale is smaller than 0.05 $\mu$m, and so the super water-repellent phenomenon can not be reflected to a water drop which has grown to larger than 0.05 $\mu$m. On the contrary, when the scale is larger than 12 $\mu$m, the super water-repellent phenomenon is effective with only a water drop which has grown to far larger than 12 $\mu$m, and the super water-repellent phenomenon can not be reflected to a water drop having a size in the range of 0.1 to 100 $\mu$m, which practically causes a problem as condensed water. When the surface multiple coefficient is less than 2.0, an apparent contact angle of teflon, of which the contact angle with water is as high as 115 degrees, becomes less than 147 degrees, which is the minimum contact angle for the super water-repellent phenomenon. Therefore, the surface multiple coefficient is preferably at least 2.0 for obtaining the super water-repellent coating film.

In accordance with the present invention, a super water-repellent organic coating film comprising a first layer, wherein the fractal dimension obtained by dispersing at least two kinds of fillers is at least 2.4, and a second layer which is located on the surface of the first layer and comprises a perfluoropolyoxyalkyl group compound or a perfluoropoly-oxyalkylene group compound, is readily prepared on a solid body by dispersing a mixture of at least two kinds of fillers into a solution comprising the perfluoropolyoxyalkyl group compound or the perfluoropolyoxyalkylene group compound, and then applying the filler-dispersed solution onto the solid body.

That means that the first layer having the fractal, of which the fractal dimension is at least 2.4, and the second layer comprising the perfluoropolyoxyalkyl group compound or the perfluoropolyoxyalkylene group compound are not necessarily to be prepared individually, for reasons to be explained later. One of the advantages of the present invention is that a super water-repellent coating film can be readily prepared on a solid body by only an operation, such as applying a filler-dispersed solution, which is obtained by dispersing a filler mixture into a solution comprising a perfluoropolyoxyalkyl group compound or a perfluoropolyoxyalkylene group compound, onto the solid body. However, in accordance with the present invention, the above two layers can be prepared individually and sequentially.

Methods for synthesizing the perfluoropolyoxyalkyl group compound and the perfluoropolyoxyalkylene group compound have been disclosed in JP-B-6-37608 (1994).

The present invention requires to compose a surface structure, in addition to the water-repellent treatment of the surface. In order to compose the surface structure, the coating film having concurrently large size concave and convex shapes in addition to fine concave and convex, is prepared by dispersing plural kinds of fillers, having different sizes, into the organic coating material, and applying the filler-dispersed coating material onto the solid body. The concave and convex shapes of the coating film differ from each other depending on the concentration of the coating material composition, and an individual optimum concentration range exists, respectively. The coating film prepared with the coating material of the optimum concentration range has a fractal dimension and a surface multiple coefficient, both of which are suitable for the super water-repellent coating film.

The fluorine group surface treating agent of the present invention effectively operates as a dispersant for the fillers, and additionally, precipitates on the surface of the coating film to produce fluorination of the surface, when the coating film is prepared. The solvent used during preparation of the coating film is a mixture of a good solvent for the perfluoropolyoxyalkyl group compound and the perfluoropolyoxyalkylene group compound having a low boiling point, and a poor solvent having a high boiling point. Therefore, the perfluoropolyoxyalkyl group compound or the perfluoropolyoxyalkylene group compound is dissolved in the good solvent soon after the applying. However, since the good solvent is evaporated fast with elapsing time, the coating material changes to become poor solvent rich, and the perfluoropolyoxyalkyl group compound or the perfluoropolyoxyalkylene group compound is separated into micro phases and aggregated at the surface of the coating film. Accordingly, high density fluorination only at the surface can be achieved.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Figure 1:
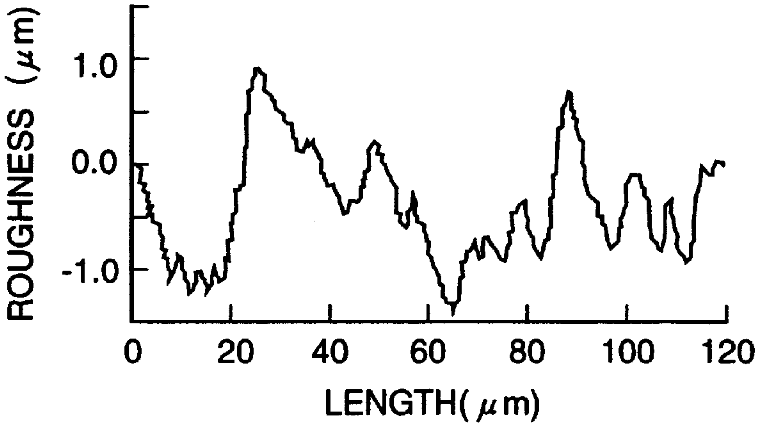
FIG. 1 is a graph indicating the surface profile of a solid body coated with a coating material using a perfluoropolyoxyalkyl group compound (x) in the embodiment 1.

Hereinafter, embodiments of the present invention will be explained with reference to the drawings.

(Embodiment 1)

A solution (1) is prepared by dissolving epoxy resin (EP1004) made by Yuka Shell Epoxy Kabusikikaisha, 4.4 g., Maruka Lyncur M, i.e. a phenolic resin made by Maruzen Petrochemical Co. Ltd., 3.0 g., and triethylammonium carbol salt, i.e. one of the accelerators made by Hokko Kagaku Kogyo Co. Ltd. with a trade name of TEA-K, 0.04 g., into a mixed solvent of methylethylketone 95 g. and butylcellosolve acetate 5 g. Then, a methylethylketone solution (10 wt. %) 1.5 g. of the perfluoropolyoxyalkyl group compound or the perfluoropolyoxyalkylene group compound, i.e. the compound expressed by the general chemical formulas (IX~XVI), is added to the solution (1) dropwise, and mixed sufficiently to obtain a solution (2). An equal amount of each of Aerosil 130 made by Nihon Aerosil Co. Ltd. (average particle diameter: 16 nm) and Nipsil E-220A made by Nippon Silica Industry Co. (average particle diameter: 1.5 $\mu$m) are mixed, and 1.5 g. of the mixture is added to the solution (2), mixed sufficiently to prepare a solution (3) of the super water-repellent coating material.

Figure 2:
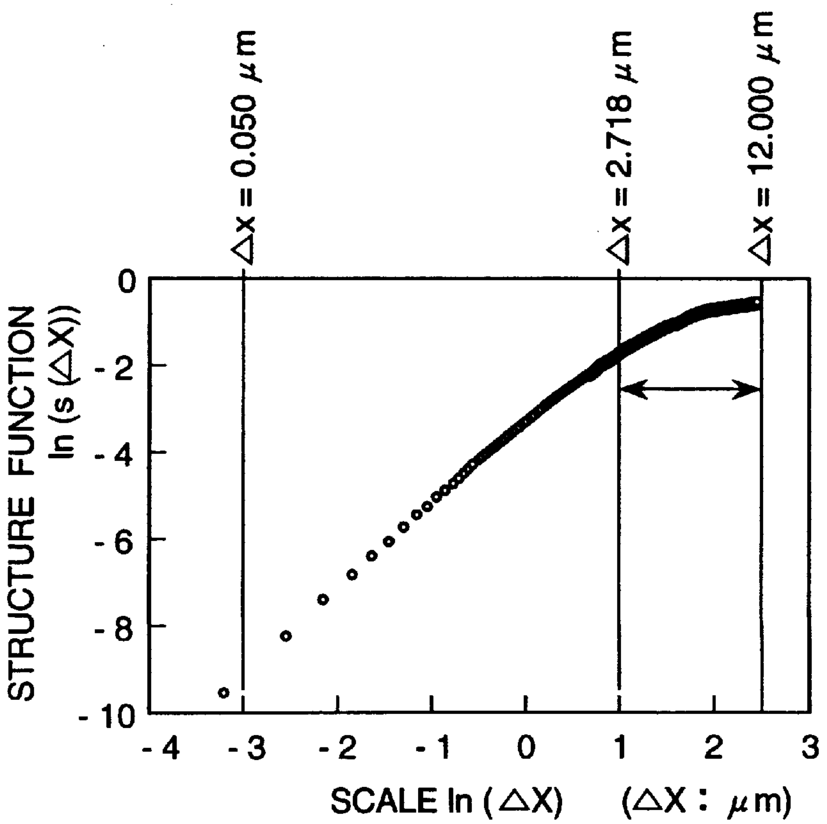
FIG. 2 is a graph indicating the result of the fractal dimension measurement when the perfluoropolyoxyalkyl group compound (x) is used in the embodiment 1.
Figure 3:
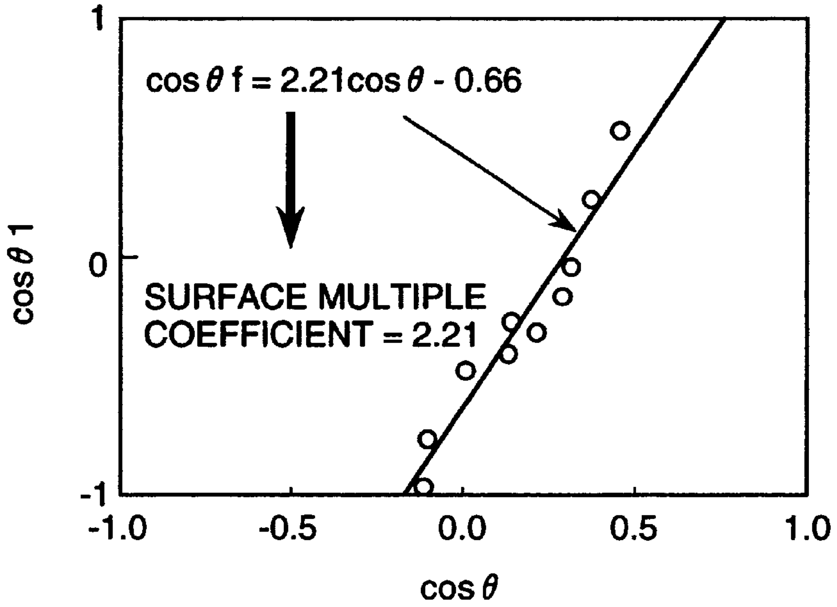
FIG. 3 is a graph indicating the surface multiple coefficient when the perfluoropolyoxyalkyl group compound (x) is used in the embodiment 1.

The solution (3) is applied onto a plate of aluminum 0.2 mm thick made by Furukawa Aluminum Industry Co. Ltd. as A100 by a dipping method, and the plate is thermally cured at 200° C. for 15 minutes. The fractal dimension (scale ($\Delta$X)=2.718~12.000 $\mu$m), surface multiple coefficient, and the contact angle with water of the coating film prepared by the above procedure were measured. FIG. 1 is a graph indicating the surface profile of the solid body coated with the coating material using the perfluoropolyoxyalkyl group compound (x). FIG. 2 indicates the result of the fractal dimension measurement when the perfluoropolyoxyalkyl group compound (x) is used. FIG. 3 indicates the surface multiple coefficient when the perfluoropolyoxyalkyl group compound (x) is used. The results of the measurement on various coating film are shown in Table 1. As measurement of a contact angle exceeding 160 degrees is impossible, the result is indicated as >160 degrees in the Table 1.

TABLE 1

| Compound, Equation No. | Fractal dimension, D at the surface* | Contact angle with water (degrees) | Surface multiple coefficient, $\gamma$ |
|---|---|---|---|
| VII | 2.45 | 157 | 2.0 |
| VIII | 2.43 | 158 | 2.1 |
| IX | 2.51 | >160 | 2.2 |
| X | 2.54 | >160 | 2.2 |
| XI | 2.45 | 152 | 2.1 |
| XII | 2.43 | 155 | 2.1 |
| XIII | 2.43 | 155 | 2.1 |
| XIV | 2.42 | 152 | 2.1 |
| XV | 2.41 | 155 | 2.1 |
| XVI | 2.44 | 158 | 2.1 |
| XVII | 2.82 | >160 | 2.5 |

TABLE 1-continued

| Compound, Equation No. | Fractal dimension, D at the surface* | Contact angle with water (degrees) | Surface multiple coefficient, γ |
|---|---|---|---|
| XVIII | 2.85 | >160 | 2.5 |
| XIX | 2.57 | >160 | 2.3 |
| XX | 2.49 | >160 | 2.2 |
| XXI | 2.43 | >160 | 2.1 |
| XXII | 2.49 | 157 | 2.1 |
| XXIII | 2.41 | >160 | 2.1 |
| XXIV | 2.48 | 157 | 2.1 |

*Scale (ΔX) = 2.718~12.000 μm

In accordance with the results shown in Table 1, all of the cases indicated preferable super water-repellent characteristics, such as a fractal dimension (Scale (ΔX) is 2.718~12.000 μm) of at least 2.4, a surface multiple coefficient of at least 2.0, and a contact angle with water of at least 150 degrees.

(Embodiment 2)

The solution (1) is prepared by the same method as the embodiment 1. Then, a methylethylketone solution (10 wt. %) 1.5 g. of the perfluoropolyoxyalkyl group compound expressed by the general chemical formula (XVIII) is added to the solution (1) dropwise, and mixed sufficiently to obtain a solution (4). An equal amount of each of Aerosil 380 made by Nihon Aerosil Co. Ltd. (average particle diameter: 7 nm) and Nipsil E-220A made by Nippon Silica Industry Co. (average particle diameter: 1.5 μm) are mixed, and 1.5 g. of the mixture is added to the solution (4), mixed sufficiently to prepare a solution (5) of the super water-repellent coating material.

Figure 4:
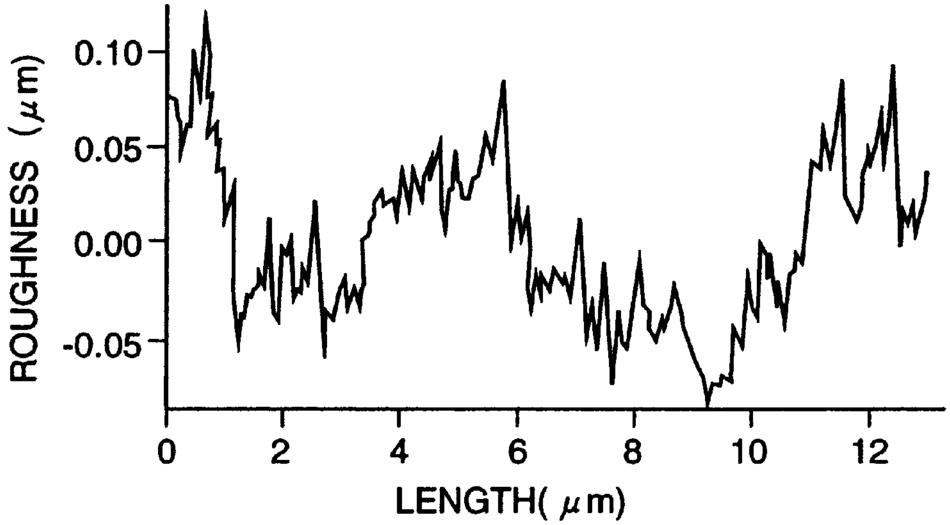
FIG. 4 a graph indicating the surface profile of the solid body in an embodiment 2.
Figure 5:
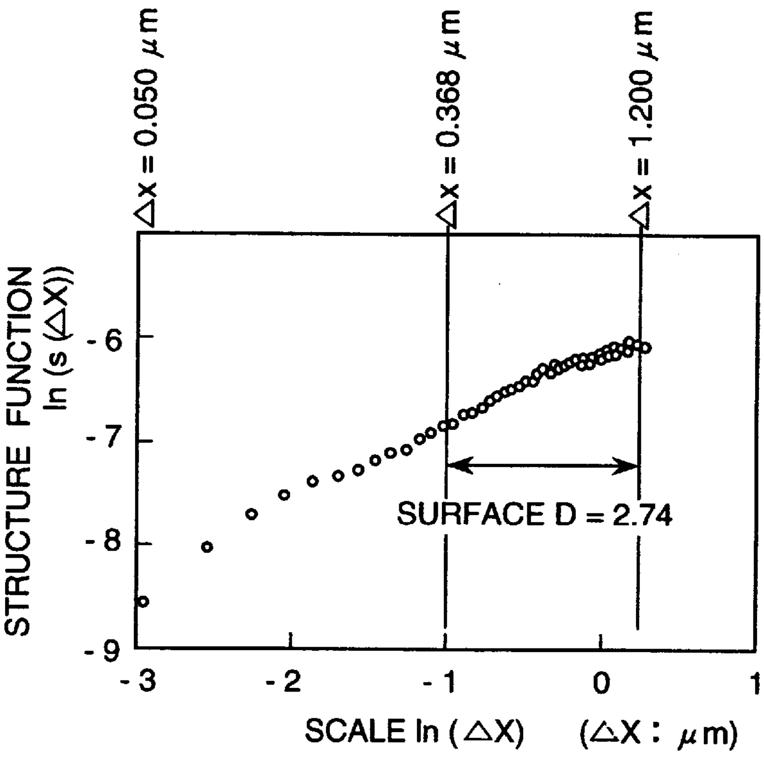
FIG. 5 is a graph indicating the result of the fractal dimension measurement in the embodiment 2.

The solution (5) is applied onto a plate of aluminum 0.2 mm thick made by Furukawa Aluminum Industry Co. Ltd. as A1100 by a dipping method, and the plate is thermally cured at 200° C. for 15 minutes. The fractal dimension (scale (ΔX)=0.368~1.200 μm), surface multiple coefficient, and the contact angle with water of the coating film prepared by the above procedure were measured. As measurement of a contact angle exceeding 160 degrees is impossible, the result is indicated as >160 degrees. FIG. 4 indicates the surface profile, FIG. 5 indicates the result of the fractal dimension measurement, and FIG. 6 indicates the surface multiple coefficient, respectively. The result of the measurement is summarized in Table 2.

TABLE 2

| Compound, Equation No. | Fractal dimension, D at the surface* | Contact angle with water (degrees) | Surface multiple coefficient, γ |
|---|---|---|---|
| XVIII | 2.74 | >160 | 2.80 |

*Scale: (ΔX) = 0.368~1.200 μm

In accordance with the results shown in Table 2, the compound indicated preferable super water-repellent characteristics, such as a fractal dimension (Scale (ΔX) is 0.368~1.200 μm) of 2.74, a surface multiple coefficient of 2.80, a the contact angle with water exceeding 160 degrees.

(Embodiment 3)

A solution (6) is prepared by dissolving silicon modified acrylic resin (Trade name: Hitaroid NK-2) made by Hitachi Chemical Co. Ltd., 5.0 g., and a curing catalyst (Trade name: Hitaroid S6010C) made by Hitachi Chemical Co. Ltd., 0.75 g. into a mixed solvent of methylethylketone 95 g. and butylcellosolve acetate 5 g. Then, a methylethylketone solution (10 wt. %) 1.5 g. of the perfluoropolyoxyalkyl group compound (Chemical group 12) is added to the solution (6) dropwise, and mixed sufficiently to obtain a solution (7). An equal amount of each of Aerosil 130 made by Nihon Aerosil Co. Ltd. (average particle diameter: 16 nm) and Nipsil E-220A made by Nippon Silica Industry Co. (average particle diameter: 1.5 μm) are mixed, and 1.5 g. of the mixture is added to the solution (7) and mixed sufficiently to prepare a solution (8) of the super water-repellent coating material.

The solution (8) is applied onto a plate of aluminum 0.2 mm thick made by Furukawa Aluminum Industry Co. Ltd. as A1100 by a dipping method, and the plate is dried naturally. The fractal dimension, surface multiple coefficient, and a contact angle with water of the coating film prepared by the above procedure were measured. The result of the measurement is summarized in Table 3.

TABLE 3

| Compound, Equation No. | Fractal dimension, D at the surface* | Contact angle with water (degrees) | Surface multiple coefficient, γ |
|---|---|---|---|
| XVIII | 2.48 | 155 | 2.10 |

*Scale (ΔX) = 0.368~1.200 μm

In accordance with the results shown in Table 3, the compound indicated preferable super water-repellent characteristics, such as a fractal dimension (Scale (ΔX) is 0.368~1.200 μm) of 2.48, the surface multiple coefficient of 2.1, and a contact angle with water of 155 degrees.

(Comparative example 1)

Figure 7:
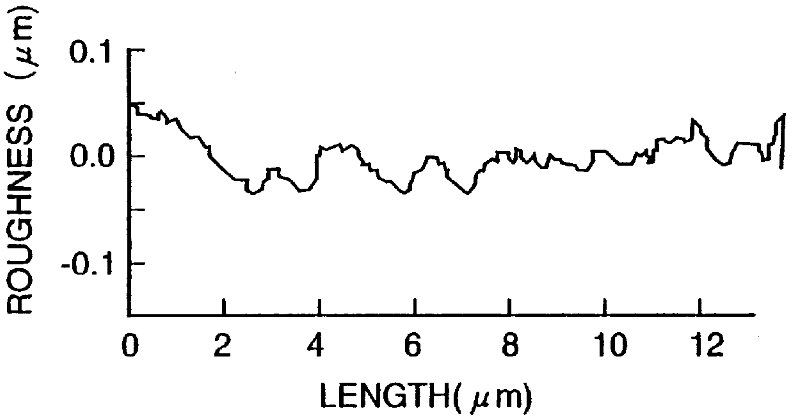
FIG. 7 a graph indicating the surface profile of the solid body in comparative example 1.
Figure 8:
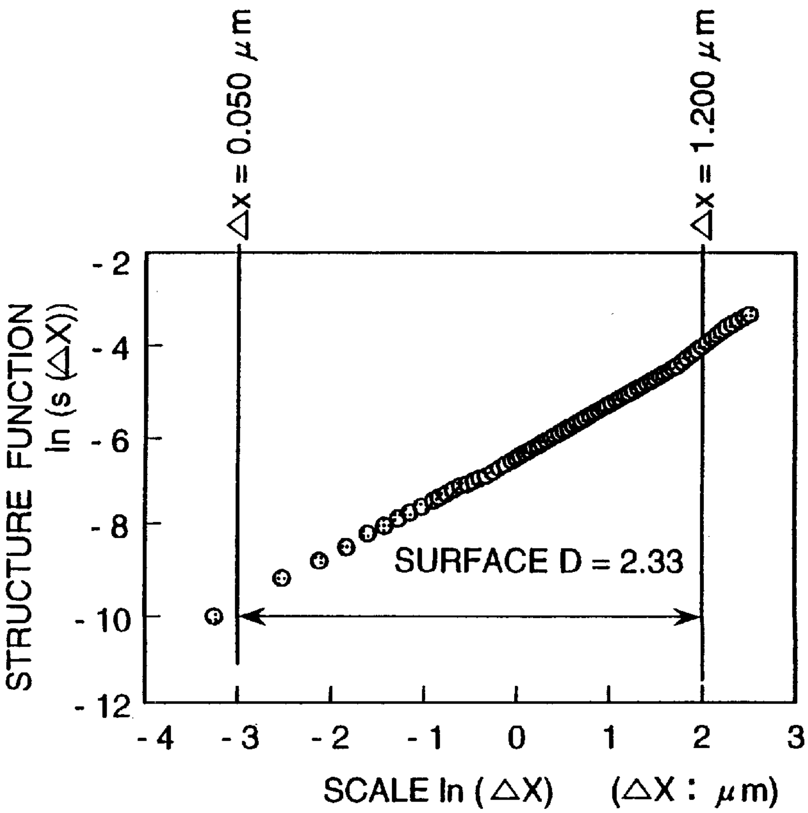
FIG. 8 is a graph indicating the result of the fractal dimension measurement in comparative example 1.
Figure 9:
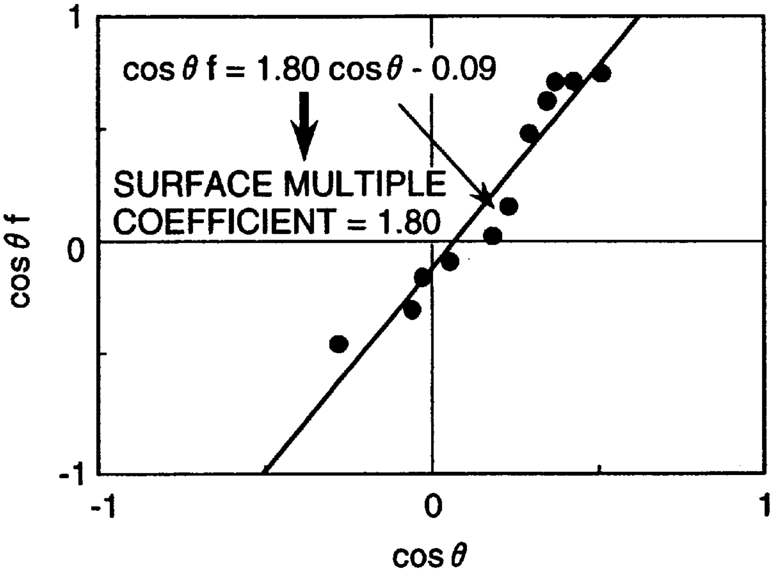
FIG. 9 is a graph indicating the surface multiple coefficient in comparative example 1.

The solution (4) in the embodiment 2 is applied onto a plate of aluminum 0.2 mm thick made by Furukawa Aluminum Industry Co. Ltd. as A1100 by a dipping method, and the plate is thermally cured at 200° C. for 15 minutes. The fractal dimension (scale (ΔX)=0.050~1.200 μm), surface multiple coefficient, and contact angle with water of the coating film prepared by the above procedure were measured. FIG. 7 indicates the surface profile, FIG. 8 indicates the result of the fractal dimension measurement, and FIG. 9 indicates the surface multiple coefficient, respectively. The result of the measurement is summarized in Table 4.

TABLE 4

| Compound, Equation No. | Fractal dimension, D at the surface* | Contact angle with water (degrees) | Surface multiple coefficient, γ |
|---|---|---|---|
| XVIII | 2.33 | 110 | 1.80 |

*Scale (ΔX) = 0.050~1.200 μm

The fractal dimension (Scale (ΔX) is 0.050~1.200 μm) of the coating film obtained in the present comparative example, wherein the filler does not exist, is relatively large at 2.33. However, the surface multiple coefficient was small at 1.80, and the contact angle with water was low at 110 degrees, so that a super water-repellent coating film was not obtained.

(Comparative example 2)

A solution (9) is prepared by dissolving epoxy resin (EP1004) made by Yuka Shell Epoxy Kabusikikaisha, 4.4 g., Maruka Lyncur M, i.e. one phenolic resin made by Maruzen Petrochemical Co. Ltd., 3.0 g., and triethylammonium carbol salt, i.e. one of accelerators made by Hokko Kagaku Kogyo Co. Ltd. with a trade name of TEA-K, 0.04 g., into a mixed solvent of methylethylketone 712.5 g. and butylcellosolve acetate 37.5 g.xxx Then, a ethylethylketone solution (10 wt. %) 1.5 g. of the perfluoropolyoxyalkyl group compound (Chemical group 12) is added to the solution (9) dropwise, and mixed sufficiently to obtain a solution (10). An equal amount of each of Aerosil 130 made by Nihon Aerosil Co. Ltd. (average particle diameter: 16 nm) and Nipsil E-220A made by Nippon Silica Industry Co. (average particle diameter: 1.5 $\mu$m) are mixed, and 1.5 g. of the mixture is added to the solution (10), mixed sufficiently to prepare a solution (11) of the super water-repellent coating material.

The solution (11) is applied onto a plate of aluminum 0.2 mm thick made by Furukawa Aluminum Industry Co. Ltd. as A1100 by a dipping method, and the plate is thermally cured at 200° C. for 15 minutes. The fractal dimension, surface multiple coefficient, and contact angle with water of the coating film prepared by the above procedure were measured. The result of the measurement is summarized in Table 5.

TABLE 5

| Compound, Equation No. | Fractal dimension, D at the surface* | Contact angle with water (degrees) | Surface multiple coefficient, $\gamma$ |
|---|---|---|---|
| XVIII | 2.23 | 110 | 1.50 |

*Scale ($\Delta$X) = 0.368~1.200 $\mu$m

In accordance with the results shown in Table 5, the fractal dimension (Scale ($\Delta$X) was 0.368~1.200 $\mu$m) was 2.23, and the surface multiple coefficient was 1.50. However, the contact angle with water was low at 110 degrees, and the water-repellent characteristics was low. As the present comparative example indicates, if the fractal dimension is less than 2.4 and the surface multiple coefficient is less than 2.0, the super water-repellent phenomenon can not be realized.

(Embodiment 4)

The solution (3) using the perfluoropolyoxyalkyl group compound (Chemical formula XVIII) in the embodiment 1 is prepared.

Figure 10:
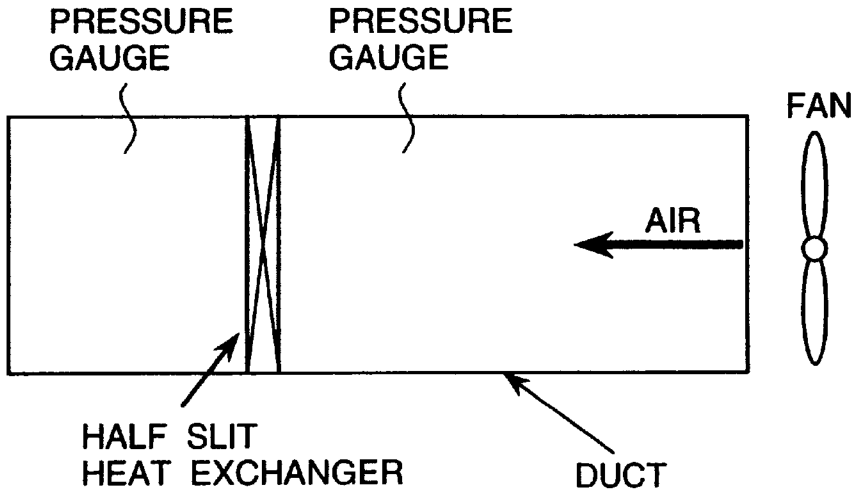
FIG. 10 is a schematic drawing of an apparatus for measuring gas flow resistance under an operating condition where frost is present.

A set of half slit heat exchanger fins (made of aluminum A1100 of the Furukawa Aluminum Industry Co. Ltd.) assembled in a size of 300 mm wide×240 mm high×1 row (17.4 mm) was applied with the solution (3) by a dipping method, assembled into a refrigerating air conditioner, and used as an evaporator under a heating condition. Ventilation resistance under a frosting condition (temperature: 275 K, humidity: 85% RH) was measured, and the frosting prevention ability was evaluated. FIG. 10 illustrates schematically the apparatus used for the evaluation. In this case, the half slit heat exchanger coated with the solution (3) was arranged in a duct, and air was blown by a fan, which was installed an upstream region of the heat exchanger, so that the wind speed in front of the heat exchanger became 1.0 m/s. The ventilation resistance was determined by pressure taps arranged at each the front and back sides of the heat exchanger. The temperature of the coolant used was 267 K.

Figure 11:
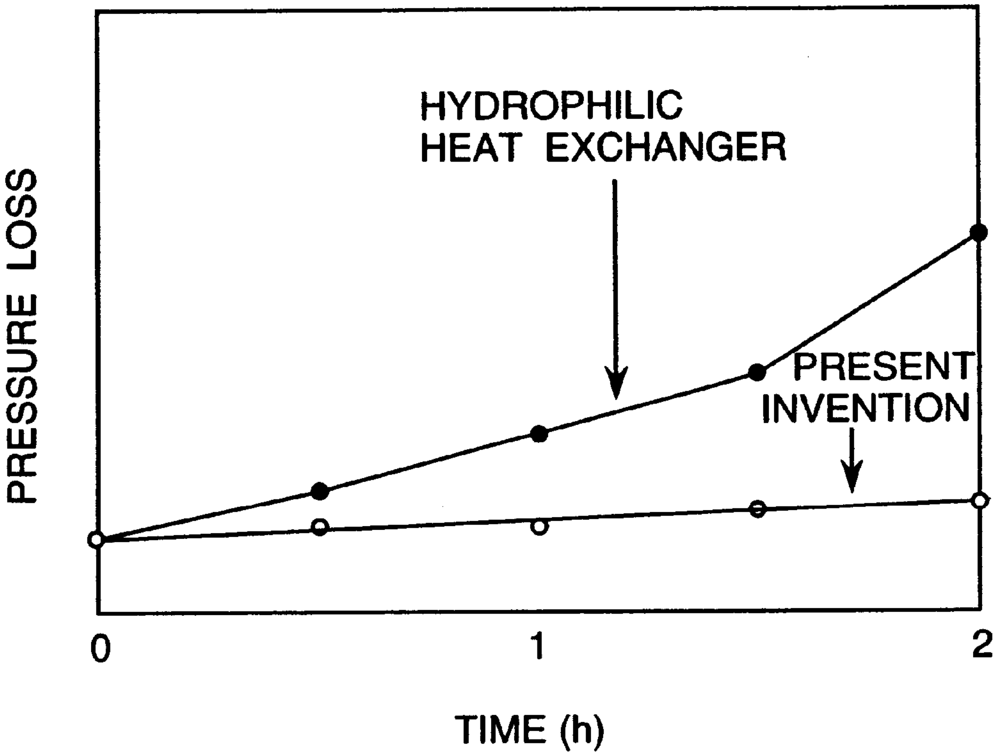
FIG. 11 is a graph indicating the result of the gas flow resistance measurement under the operating condition where frost is present.

For comparison, the same ventilation resistance was evaluated on a half slit heat exchanger coated with a conventional precoat hydrophilic film. FIG. 11 indicates the change in the ventilation resistance under the frosting condition with elapsing time. The ventilation resistance after two hours of operation of the hydrophilic heat exchanger was increased to 5.1 times the initial resistance by frosting on the fins. On the contrary, the ventilation resistance of the heat exchanger coated with the super water-repellent coating film of the present invention was increased only 1.2 times, and the frosting on the fins was hardly observed.

In accordance with the above observation, the super water-repellent coating film of the present invention was remarkably effective for preventing frosting of the heat exchanger, because adhesion of the condensed water was hardly observed even in a frosting condition.

The results shown in Table 1 reveals that all the cases indicate a fractal dimension (Scale ($\Delta$X) is 2.718~12.000 $\mu$m) of at least 2.4, a surface multiple coefficient of at least 2.0, and preferable super water-repellent characteristics, such as a contact angle with water of at least 150 degrees.

(Embodiment 5)

A solution (A) of coating material concentration 1~20wt. % is prepared by dissolving epoxy resin(EP1004) made by Yuka Shell Epoxy Kabusikikaisha, 4.4 g., Maruka Lyncur M, i.e. one phenolic resin made by Maruzen Petrochemical Co. Ltd., 3.0 g., and triethylammonium carbol salt, i.e. one of accelerators made by Hokko Kagaku Kogyo Co. Ltd. with a trade name of TEA-K, 0.04 g., into a mixed solvent of methylethylketone 95 parts by weight and butylcellosolve acetate 5 parts by weight. Then, a solution (B) is prepared by adding the perfluoropolyoxyalkyl group compound (chemical formula XVIII) to the solution (A) by 0.05~2.0 wt. % to the coating material. Aerosil 130 made by Nihon Aerosil Co. Ltd. (average particle diameter: 16 nm) and Nipsil E-220A made by Nippon Silica Industry Co. (average particle diameter: 1.5 $\mu$m) are mixed with a ratio of 3:1 by weight, and the mixture is added to the solution (B ) by 5~80 wt. % to the coating material and agitated sufficiently to prepare a solution (C) of the super water-repellent coating material.

Figure 6:
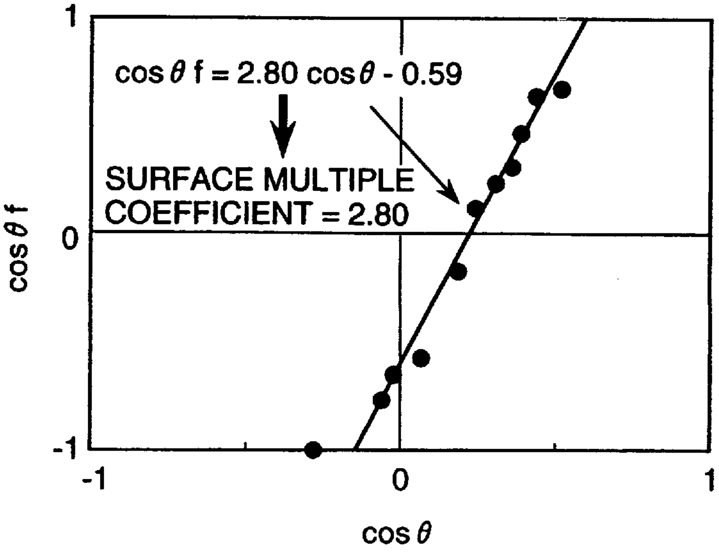
FIG. 6 is a graph indicating the surface multiple coefficient in the embodiment 2.

The solution (C) is applied onto a plate of aluminum 0.2 mm thick made by Furukawa Aluminum Industry Co. Ltd. as A1100 by a dipping method, and the plate is thermally cured at 200° C. for 15 minutes. The fractal dimension (scale ($\Delta$X)=2.718~12.000 $\mu$m), surface multiple coefficient, and contact angle with water of the coating film prepared by the above procedure were measured. The result of the measurement is shown in FIG. 6. As the measurement of a contact angle exceeding 160 degrees is impossible, the result is indicated as >160 degrees in the Table 6.

TABLE 6

| No. | Coating material concentration | Amount to coating material (wt. %) filler | XVIII | Coating material appearance* (× 500 times) | Fractal dimension (D) | contact angle with water (deg.) |
|---|---|---|---|---|---|---|
| 1 | 20 | 17 | 2 | No defect | 2.53 | >160 |
| 2 | 10 | 17 | 2 | No defect | 2.84 | >160 |
| 3 | 5 | 17 | 2 | No defect | 2.55 | >160 |
| 4 | 2 | 17 | 2 | No defect | 2.53 | 155 |
| 5 | 1 | 17 | 2 | Wet spots | Unmeasurable | Unmeasurable |
| 6 | 7 | 5 | 2 | No defect | 2.35 | 135 |
| 7 | 7 | 10 | 2 | No defect | 2.55 | >160 |
| 8 | 7 | 20 | 2 | No defect | 2.78 | >160 |
| 9 | 7 | 40 | 2 | No defect | 2.66 | 158 |
| 10 | 7 | 60 | 2 | No defect | 2.65 | 155 |
| 11 | 7 | 80 | 2 | Wet spots | Unmeasurable | Unmeasurable |
| 12 | 7 | 17 | 0.05 | No defect | 2.36 | 133 |
| 13 | 7 | 17 | 0.1 | No defect | 2.45 | >160 |
| 14 | 7 | 17 | 0.2 | No defect | 2.78 | >160 |
| 15 | 7 | 17 | 0.5 | No defect | 2.68 | >160 |
| 16 | 7 | 17 | 1.0 | No defect | 2.52 | >160 |
| 17 | 7 | 17 | 2.0 | Wet spots | Unmeasurable | Unmeasurable |

*Observation with optical microscope

In accordance with the result shown in Table 6, the composition in the range of 10~60 wt. % of filler to the organic coating material, 1~10 wt. % of the perfluoropolyoxyalkyl group compound expressed by the general chemical formula (I) to the organic coating material, and at least 2 wt. % of the organic coating material concentration to the solvent are revealed to be preferable for achieving super water-repellent characteristics, because of the contact angle with water of at least 150 degrees.

In the above explanation of the present invention, only coating material composed of a mixture comprising organic coating material, filler, perfluoropolyoxyalkyl compound, and solvent is described. However, in consideration of the composition of the present invention, a method for forming the coating film, wherein a fractal plane is formed on the surface of a solid body first with the organic coating material, the filler, and the solvent, and then, the perfluoropolyoxyalkyl compound is applied onto the surface, can be used. Furthermore, the fractal surface can be obtained by etching, manufacturing such as mechanical grinding, or chemical measures such as covering the surface with crystallized metal, ceramics, or an organic compound.

In accordance with the present invention, the super water-repellent coating film and a coating material to generate the super water-repellent coating film can be provided. The super water-repellent coating film can be utilized for preventing snow covering, frosting, ice coating, and the like. Practically, the super water-repellent coating film can be utilized in, for instance, treatment of the evaporator fin surface of an air conditioner for preventing the fin from frosting during heating operation, or treatment of a parabolic antenna surface, of which the maintenance operation in winter is difficult because of heavy snow. Other practically applicable fields of the super water-repellent coating film are, for example, as a coating material for preventing icing of ships and aircraft, a coating material for the outer wall of houses, and a surface coating material for preventing water drop adhesion on the windshield of an automobile.

What is claimed is:

1. A solid body having a super water-repellent coating film comprising an organic coating film formed on a surface of the solid body, surface roughness of said surface being at least 200 nm, wherein said organic coating film comprises:

a first layer having fractal dimension of at least 2.4, which is obtained by coating said surface of the solid body with a coating material containing an organic polymer and having dispersed therein at least two kinds of fillers, and a second layer composed of a perfluoropolyoxyalkyl group compound or a perfluoropolyoxyalkylene group compound on the surface of said first layer.

2. A solid body having a super water-repellent coating film comprising an organic coating film formed on a surface of the solid body, surface roughness of said surface being at least 200 nm, wherein said organic coating film comprises:

a first layer having fractal dimension of at least 2.4, which is obtained by coating said surface of the solid body with a coating material containing an organic polymer and having dispersed therein at least two kinds of fillers, and a surface multiple coefficient, which is a coefficient giving the ratio of actual area of a rough surface to the projected area, in the range of at least 2.0, and a second layer composed of a perfluoropolyoxyalkyl group compound or a perfluoropolyoxyalkylene group compound on the surface of said first layer.

3. A solid body as claimed in either of claims 1 and 2, wherein said filler has an average particle diameter of at least 5 nm.

4. A solid body as claimed in claim 3, wherein the at least two kinds of fillers have different diameters from each other.

5. A solid body as claimed in claim 3, wherein said fillers have a specific surface area of at least 100 $m^2/g$.

6. A solid body as claimed in claim 3, wherein said solid body is an evaporator fin, having a fin member and said coating film covering said fin member.

7. A solid body as claimed in claim 3, wherein said solid body is a refrigerating air conditioner provided with an evaporator fin, said evaporator fin having a fin member and said coating film covering said fin member.

8. A solid body as claimed in claim 3, wherein said solid body is an electric wire coated with said coating film.

9. A method for forming the solid body claimed in claim 3, comprising the steps of:

dispersing a filler mixture composed of at least two kinds of fillers into a solution containing perfluoropolyoxyalkyl group compound or perfluoropolyoxyalkylene group compound, and applying said dispersed solution onto the solid body.

10. A solid body as claimed in either of claims 1 and 2, wherein said perfluoropolyoxyalkyl group compound or said perfluoropolyoxyalkylene group compound is expressed by the following general chemical formula (I)

$$Rf(—A—X—B—Y)n \quad (I)$$

where,

Rf: perfluoropolyoxyalkyl group or perfluoropolyoxyalkylene group,

A and B: any one of amido group, ester group, or ether group,

X: any one of the following group;

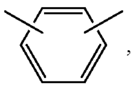
,
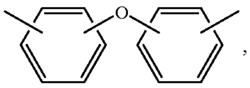
,
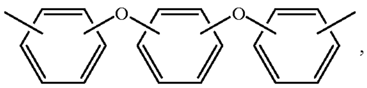
,
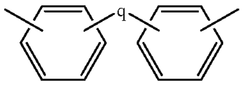

or

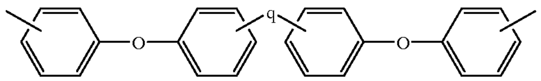

(where, q is any one of $—CH_2—$, $—C(CH_3)_2—$, $—C(CF_3)_2—$, —S—, $—SO_2—$, or direct bond), Y: any one of the following group; and

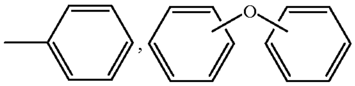

n: 1 or 2.

11. A solid body as claimed in claim 10, wherein said perfluoropolyoxyalkyl group contains the oxyalkylene repeating unit expressed by the following formulas (II), (III), or (Iv), individually or as a mixture of these units;

$$—(CF_2—O)—, \quad \text{(II)}$$

$$—(C_2F_4—O)—, \text{ and} \quad \text{(III)}$$

$$—(C_3F_6—O)—. \quad \text{(IV)}$$

12. A solid body as claimed in claim 11, wherein said solid body is an evaporator fin, having a fin member and said coating film covering said fin member.

13. A solid body as claimed in claim 11, wherein said solid body is a refrigerating air conditioner provided with an evaporator fin, said evaporator fin having a fin member and said coating film covering said fin member.

14. A solid body as claimed in claim 11, wherein said solid body is an electric wire coated with said coating film.

15. A method for forming the solid body claimed in claim 11, comprising the steps of:

dispersing a filler mixture composed of at least two kinds of fillers into a solution containing perfluoropolyoxyalkyl group compound or perfluoropolyoxyalkylene group compound, and applying said dispersed solution onto the solid body.

16. A solid body as claimed in claim 10, wherein said solid body is an evaporator fin, having a fin member and said coating film covering said fin member.

17. A solid body as claimed in claim 10, wherein said solid body is a refrigerating air conditioner provided with an evaporator fin, said evaporator fin having a fin member and said coating film covering said fin member.

18. A solid body as claimed in claim 10, wherein said solid body is an electric wire coated with said coating film.

19. A method for forming the solid body claimed in claim 10, comprising the steps of:

dispersing a filler mixture composed of at least two kinds of fillers into a solution containing perfluoropolyoxyalkyl group compound or perfluoropolyoxyalkylene group compound, and applying said dispersed solution onto the solid body.

20. A solid body as claimed in either of claims 1 and 2, wherein the at least two kinds of fillers have different diameters from each other.

21. A solid body as claimed in either of claims 1 and 2, wherein said fillers have a specific surface area of at least 100 $m^2/g$.

22. A solid body as claimed in either of claims 1 and 2, wherein said solid body is an evaporator fin, having a fin member and said coating film covering said fin member.

23. A solid body as claimed in either of claims 1 and 2, wherein said solid body is a refrigerating air conditioner provided with an evaporator fin, said evaporator fin having a fin member and said coating film covering said fin member.

24. A solid body as claimed in either of claims 1 and 2, wherein said solid body is an electric wire coated with said coating film.

25. A method for forming the solid body claimed in either of claims 1 and 2, comprising the steps of:

dispersing a filler mixture composed of at least two kinds of fillers into a solution containing perfluoropolyoxyalkyl group compound or perfluoropolyoxyalkylene group compound, and applying said dispersed solution onto the solid body.

* * * * *